United States Patent
Woodward et al.

[11] Patent Number: 6,155,658
[45] Date of Patent: Dec. 5, 2000

[54] PROFILED FRAME FOR A SWITCHGEAR CABINET

[75] Inventors: Michael Woodward, Looe; Paul Runnalls, Liskeard, both of United Kingdom

[73] Assignee: Rittal-Werk Rudolf Loh GmbH & Co. KG, Herborn, Germany

[21] Appl. No.: 09/376,209

[22] Filed: Aug. 18, 1999

[51] Int. Cl.[7] ................................................ A47B 95/04
[52] U.S. Cl. ...................................... 312/204; 312/265.4
[58] Field of Search ........................... 312/265.1, 265.2, 312/265.3, 265.4, 223.1, 204, 263, 265.6; 211/189, 190, 191

[56] References Cited

U.S. PATENT DOCUMENTS

| | | | |
|---|---|---|---|
| 3,588,212 | 6/1971 | Gersch | 312/204 |
| 4,172,623 | 10/1979 | Anderson | 312/257.1 |
| 4,958,259 | 9/1990 | Al | 312/265.2 |
| 5,590,939 | 1/1997 | Piontek | 312/265.6 |

FOREIGN PATENT DOCUMENTS

| | | |
|---|---|---|
| 0 419 934 A2 | 4/1991 | European Pat. Off. . |
| 94 21 342 U1 | 10/1995 | Germany . |
| 43 33 025 C2 | 10/1996 | Germany . |
| 295 20 355 U1 | 6/1997 | Germany . |
| 196 47 726 A1 | 5/1998 | Germany . |
| 195 36 926 C2 | 2/1999 | Germany . |

*Primary Examiner*—Peter M. Cuomo
*Assistant Examiner*—Jerry A. Anderson
*Attorney, Agent, or Firm*—Pauley Petersen Kinne & Fejer

[57] ABSTRACT

A profiled frame for a switchgear cabinet with an inner profiled section and an outer profiled section. The inner profiled section is made from a sheet steel blank and is or can have fastening receivers, on which built-ins can be fixed in place in an interior of the switchgear cabinet. The profiled frame can be visually individualized if the outer profiled section is designed as an extruded profiled section and has one or several ornamented surfaces oriented toward the exterior of the switchgear cabinet.

11 Claims, 2 Drawing Sheets

PROFILED FRAME FOR A SWITCHGEAR CABINET

BACKGROUND OF THE INVENTION

1. Field of the Invention

This invention relates to a profiled frame for a switchgear cabinet with an inner profiled section and an outer profiled section, wherein the inner profiled section is made from a sheet steel blank and can have fastening receivers, on which built-ins can be fixed in place in an interior of the switchgear cabinet.

2. Description of Prior Art

A profiled frame is known from German Patent Reference DE 195 36 926. An outer profiled section, made from a sheet steel blank which is beveled several times, is used. The outer profiled section has two profiled sides positioned at an angle with respect to each other, which are oriented toward the interior of the switchgear cabinet. The two profiled sections form an inner receiver for an inner profiled section. The inner profiled section is used as a mounting rail and has rows of fastening receivers. The inner profiled section can be connected with the outer profiled section, for example by fastening screws. Built-ins can be fixed in place in the interior of the switchgear cabinet on the fastening receivers of the inner profiled section. Because of its cross-sectional design and of the sheet steel used, the outer profiled section can absorb large loads. The known profiled frame section is used for constructing a profiled frame. The profiled frame includes a switchgear cabinet body, which can be closed by lateral walls and a cabinet door. In corner areas of the switchgear cabinet, the lateral walls extend over the profiled frame sections, so that they cannot be seen from the outside.

A switchgear cabinet is known from German Patent Reference DE 43 33 025 C2, which has four vertical profiled frames. The profiled frames are formed of extruded profiled aluminum sections. In order to be able to absorb high loads, the extruded profiled section must have an appropriate cross-sectional design. In connection with extruded profiled sections there is the advantage, that the exteriors of the profiled sections can be designed with ornamental elements, for example formed longitudinal strips.

SUMMARY OF THE INVENTION

It is one object of this invention to provide a profiled frame section of the type mentioned above, which has a high degree of strength and partial areas facing an outside of the switchgear cabinet which are designed to be visually pleasant, at least in part.

This object is achieved with an outer profiled section designed as an extruded profiled section that has one or several ornamented surfaces oriented toward the exterior of the switchgear cabinet.

Thus, the profiled frame has an outer profiled section and an inner profiled section, wherein the outer profiled section can have visually pleasing ornamental surfaces, resulting from a simple production process. For example, it would be conceivable to provide convexly or concavely shaped surfaces, which extend in the longitudinal direction of the profiled section. The inner profiled section, which is made from a sheet steel blank, has great rigidity and permits the absorption of high loads. Thus, with the combination of the inner profiled section and the outer profiled section, it is possible to generate visually pleasant profiled frames which have a great strength, but a relatively small cross section.

In a preferred embodiment of this invention, the inner profiled section has a plug receiver, into which a plug shoulder of the outer profiled section is inserted. The inner profiled section has a detent face, with which the outer profiled section contacts with a contact surface for limiting the insertion movement of the plug shoulder. With the plug shoulder inserted, the outer profiled section is screwed together with the inner profiled section. The plug shoulder and the detent face of the inner profiled section therefore make possible, in a simple manner, an exact alignment of the outer profiled section and at the same time a quick assembly.

In another preferred embodiment of this invention, the outer profiled section has a screw channel formed on it and extending in the longitudinal profile direction, which is embodied in a groove shape, with an open side facing the inner profiled section. Fastening screws can be inserted into screw receivers of the inner profiled section and screwed into the screw channel for fixing the outer profiled section in place on the inner profiled section. Thus, the outer profiled section can be arbitrarily cut off a semi-finished profiled section and thereafter connected with the inner profiled section. Because of the screw channel, an additional outlay for attaching screw receivers is not necessary.

A profiled frame in accordance with this invention is distinguished because the inner profiled section has two profiled sides, extending at right angles in relation to each other, which face the interior of the switchgear cabinet and have rows of fastening receivers, which are arranged spaced apart from each other at equal distances. An outer wall facing the exterior of the switchgear cabinet is connected with one of the profiled sides, on which the outer profiled section is supported. The detent face, on which the detent face of the outer profiled section is supported, is arranged at an angle with the outer wall.

A particular visual quality of the switchgear cabinet results if with a leg and a profile element, which extends at an angle with respect to the leg, the inner profiled section forms an outer edge extending in the longitudinal profile direction, and the outer profile extends around the outer edge.

In order to be able to flexibly react to different requirements regarding the fastening situation in the switchgear cabinet interior, in connection with a preferred embodiment of this invention a separate fastening rail, which extends in the longitudinal profile direction, is attached to the inner profiled section, which has fastening receivers and which faces the interior of the switchgear cabinet. Depending on the type of use, it is possible to equip a fastening rail, having a defined arrangement of fastening receivers, with the profiled frame.

In order to be able to protect an area of the connection of the outer profiled section with the inner profiled section visually and against unauthorized manipulations, a leg is connected with the outer wall of the inner profiled section via a transition section, which is angled in the direction toward the exterior of the profiled frame. The outer profiled section is fixed in place on the inner profiled section in the area of the outer wall and extends over the leg with an ornamental surface, wherein the ornamental surface is kept at a distance from the outer wall. A lateral wall attached to the switchgear cabinet extends over the outer wall and finally the outer wall makes a transition into the ornamental surface.

BRIEF DESCRIPTION OF THE DRAWINGS

This invention will be described in greater detail in what follows by means of an exemplary embodiment represented in the drawings.

DETAILED DESCRIPTION OF PREFERRED EMBODIMENTS

Figure 1:
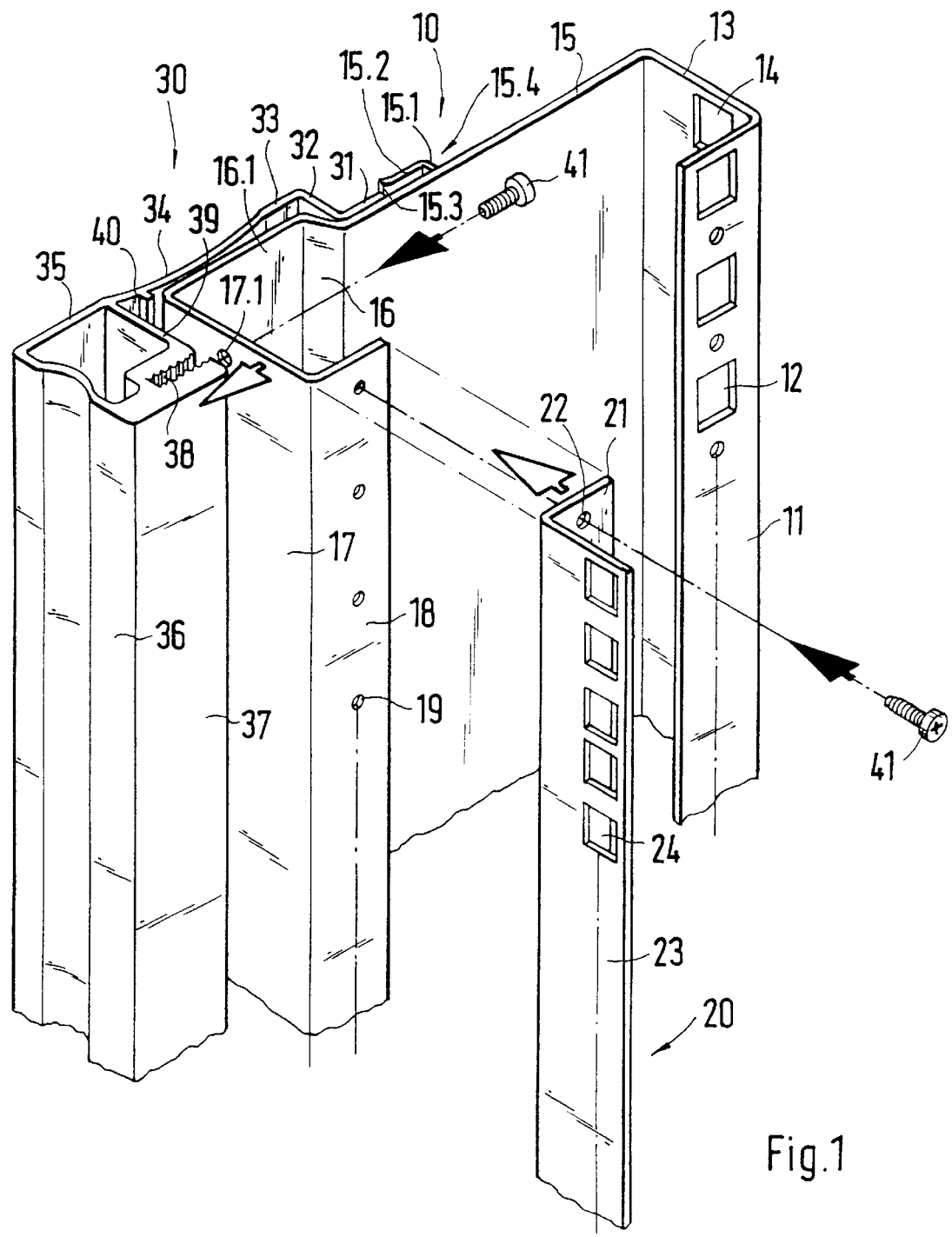
FIG. 1 is a perspective view of a portion of a profiled frame, partially in an exploded view.

A section of a profiled frame is shown in FIG. 1, which can be used for constructing a profiled frame for a switchgear cabinet. The profiled frame is designed in two parts and comprises of an inner profiled section 10 and an outer profiled section 30.

The inner profiled section 10 is made from a sheet steel blank and has two profiled sides 11, 13 oriented in the direction toward the interior of the switchgear cabinet, each of which has a row of fastening receivers 12, 14. The profiled side 13 extends vertically with respect to the facing lateral face of the switchgear cabinet. An outer wall 15 is connected at right angles with the profiled side 13. The outer wall 15 has a plug receiver 15.4. In detail, the plug receiver 15.4 has a shoulder 15.1 which is connected to the outer wall 15, for example is welded. The shoulder 15.1 transitions into a leg 15.2, which extends parallel with, but at a distance from the outer wall 15. An insertion aid 15.3 is bent from the end of the leg 15.2. The insertion aid 15.3 extends at an angle in relation to the outer wall 15 and extends the plug receiver 15.4.

A leg 16.1 is connected via a transition section 16 to the outer wall 15. The transition section 16 is bent away from the outer wall 15 in the direction toward the exterior of the switchgear cabinet. Therefore the leg 16.1 is spaced apart and parallel with the outer wall 15. A detent surface 17 angles off the leg 16.1. Between them, the detent surface 17 and the leg 16.1 form a right angle. Screw receivers 17.1 are cut into the detent surface 17. The detent surface 17 terminates in an end section 18, which is also bent off parallel with the leg 16.1. As shown in FIG. 1, the flat end section 18 extends in one plane together with the profiled side 11. The end section 18 has a row of fastening receivers 19, which are spaced apart at even distances from each other. An angled fastening element 20 can be connected to the end section 18. The angled fastening element 20 has two legs 21, 23 extending at right angles with respect to each other. A row of fastening receivers 24 is cut into the leg 23, and the fastening receivers 24 are also arranged spaced apart from each other. The leg 21 has screw receivers 22, through which fastening screws 41 extend, which can be screwed into the fastening receivers 19 of the end section 18. In the screwed-on state, the leg 23 lies in one plane with the detent surface 17, shown in FIG. 2. Built-ins can be fastened in the interior of the switchgear cabinet on the fastening receivers 24, as well as on the fastening receivers 12 and 14 of the profiled sides 11 and 13. Differently designed angled fastening elements 20 can be selectively installed on the inner profiled section 10. It is thus possible to achieve a high degree of flexibility, so that the most varied cases of application with respect to the installation of built-ins in the interior of the switchgear cabinet can be satisfied.

The outer profiled section 30 can be fastened on the inner profiled section 10. The outer profiled section 30 has a plug shoulder 31, on which an intermediate element 32 is formed at right angles. The intermediate element 32 transitions into a partial exterior wall 33, which has an ornamental surface 34. The partial exterior wall 33 has a support section 40 on the side facing away from the ornamental surface 34. The support section 40 protrudes in the direction toward the inner profiled section 10. A hollow profiled section, which is square in cross section, adjoins the partial exterior wall 33. In detail, the hollow profiled section has a further partial exterior wall 35, which lies in the same plane as the partial exterior wall 33. A contact surface 39 and an ornamental surface 36 extend at right angles to the second partial exterior wall 35. The ornamental surface 36 and the contact surface 39 extend parallel with the detent surface 17 of the inner profiled section 10. The ornamental surface 36 has a depression. A fastening section 37 is formed on the outer profiled section 30 parallel with the second partial exterior wall 35. The outer profiled section 30 has a bulge-like thickening in the area between the fastening section 37 and the contact surface 39, into which a screw channel 38 is cut. The screw channel 38 is designed groove-like and extends in the longitudinal direction of the outer profiled section 30.

Figure 2:
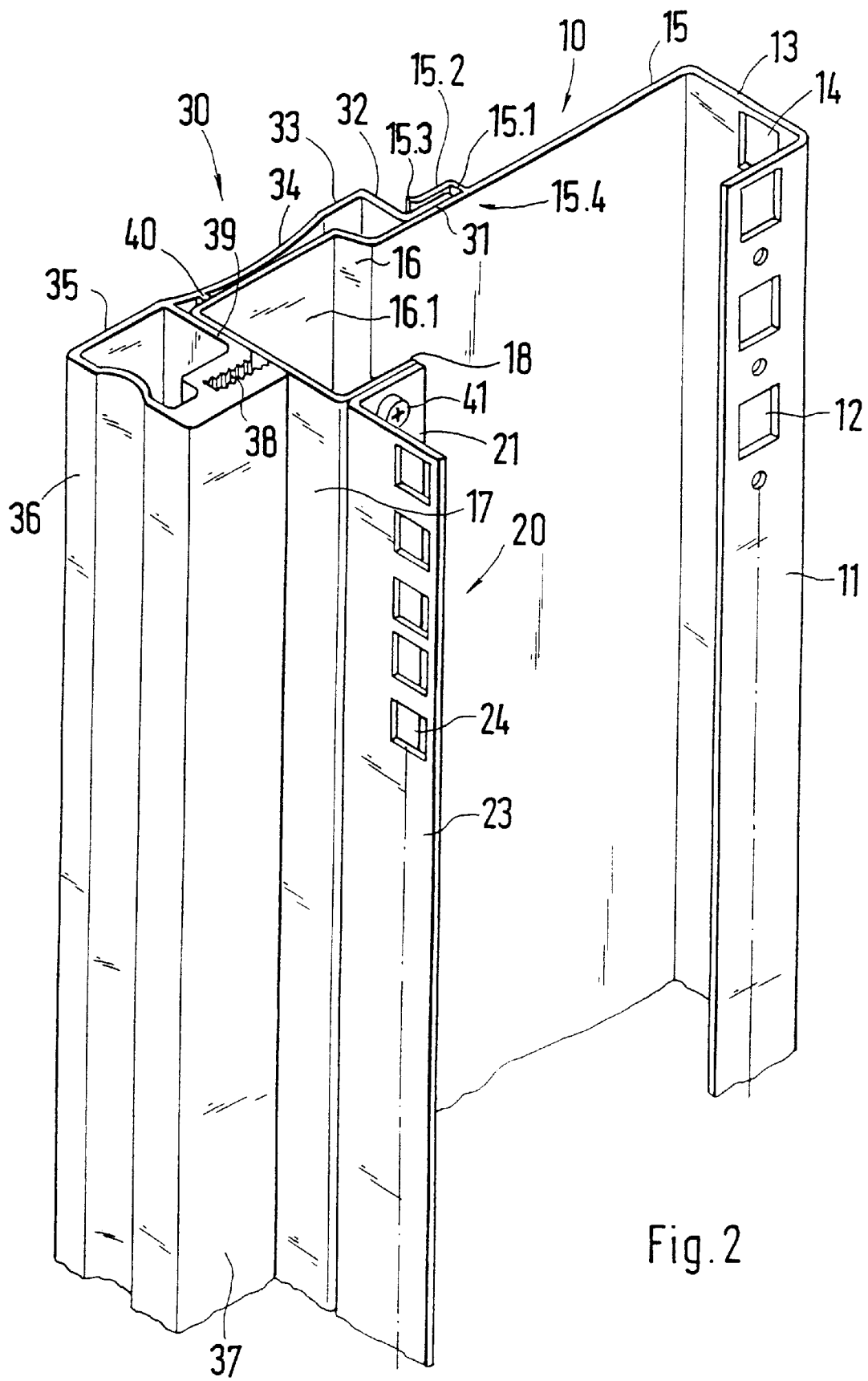
FIG. 2 is a perspective view in accordance with FIG. 1, in an assembled state.

For assembling the profiled frame, the plug shoulder 31 of the outer profiled section 30 is inserted into the plug receiver 15.4 of the inner profiled section 10. Insertion is easier with the insertion aid 15.3. The insertion movement of the plug shoulder 31 into the plug receiver 15.4 is limited by the contact surface 39, which rests against the detent surface 17, as shown in FIG. 2. The support section 40 rests against the leg 16.1 of the inner profiled section 10.

Fastening screws 41 are used for connecting the inner profiled section 10 with the outer profiled section 30, which can be passed through the screw receivers 17.1 and screwed into the screw channel 38.

The profiled frame in its final assembled state, to which the angled fastening element 20 is also attached, is shown in the drawing of the assembled state in FIG. 2. As shown, the fastening location of the plug shoulder 31 and the plug receiver 15.4 is arranged set back in relation to the partial exterior wall 33 of the outer profiled section 30. It is thus possible to cover the fastening location with a lateral wall connected to the side of the profiled frame. The lateral wall then makes a flush transition into the partial exterior wall 33.

What is claimed is:

1. In a profiled frame for a switchgear cabinet having an inner profiled section and an outer profiled section, wherein the inner profiled section is made from a sheet steel blank and has a plurality of fastening receivers on which built-ins can be fixed in place in an interior of the switchgear cabinet, the improvement comprising:

the outer profiled section (30) designed as an extruded profiled section and having at least one ornamental surface (34, 36) oriented toward an exterior of the switchgear cabinet;

the outer profiled section having one of a convexly shaped surface and a concavely shaped surface extending in a longitudinal profile direction on the at least one ornamental surface (34, 36);

the inner profiled section (10) having a plug receiver (15.4) into which a plug shoulder (31) of the outer profiled section (30) is inserted, the inner profiled section (10) having a detent surface (17) with which the outer profiled section (30) contacts with a contact surface (39) and limits an insertion movement of the plug shoulder (31), and with the plug shoulder (31) inserted the outer profiled section (30) screwed together with the inner profiled section (10); and the outer profiled section (30) having screw channel (38) formed and extending in the longitudinal profile direction, which is embodied in a groove shape and has an open side facing the inner profiled section (10), and a plurality of fastening screws (41) inserted into screw receivers (17.1) of the inner profiled section (10) and screwed into the screw channel (38) to fix the outer profiled section (30) in place on the inner profiled section (10).

2. In the profiled frame in accordance with claim 1, wherein with a leg (16.1) and a profile element which extends at an angle with respect to the leg (16.1) the inner profiled section (10) forms an outer edge extending the longitudinal profile direction, and the outer profiled section (30) extends around the outer edge.

3. In the profiled frame in accordance with claim 1, wherein a separate fastening rail (20) which extends in a longitudinal profile direction is attached to the inner profiled section (10) and has the fastening receivers (24) and faces the interior of the switchgear cabinet.

4. In the profiled frame in accordance with one claim 1, wherein a leg (16.1) is connected with the outer wall (15) of the inner profiled section (10) via a transition section (16) which is angled in a direction toward the exterior of the profiled frame, the outer profiled section (30) is fixed in place on the inner profiled section (10) in an area of the outer wall (15) and extends over the leg (16.1) with the at least one ornamental surface (34) wherein the at least one ornamental surface (34) is at a distance from the outer wall (15), and a lateral wall attached to the switchgear cabinet extends over the outer wall (15) and transitions into the ornamental surface (34).

5. In the profiled frame in accordance with claim 1, wherein the inner profiled section (10) has two profiled sides (11, 13) extending at right angles with respect to each other and which face the interior of the switchgear cabinet and have rows of fastening receivers (12, 14) spaced apart from each other at equal distances, an outer wall (15) facing the exterior of the switchgear cabinet is connected with one of the profiled sides (13) on which the outer profiled section (30) is supported, and the detent surface (17) on which a detent face (39) of the outer profiled section (30) is supported is arranged at an angle with the outer wall (15).

6. In the profiled frame in accordance with claim 5, wherein with a leg (16.1) and a profile element which extends at an angle with respect to the leg (16.1) the inner profiled section (10) forms an outer edge extending the longitudinal profile direction, and the outer profiled section (30) extends around the outer edge.

7. In the profiled frame in accordance with claim 6, wherein a separate fastening rail (20) which extends in the longitudinal profile direction is attached to the inner profiled section (10) and has the fastening receivers (24) and faces the interior of the switchgear cabinet.

8. In the profiled frame in accordance with one claim 7, wherein a leg (16.1) is connected with the outer wall (15) of the inner profiled section (10) via a transition section (16) which is angled in a direction toward the exterior of the profiled frame, the outer profiled section (30) is fixed in place on the inner profiled section (10) in an area of the outer wall (15) and extends over the leg (16.1) with the at least one ornamental surface (34) wherein the at least one ornamental surface (34) is at a distance from the outer wall (15), and a lateral wall attached to the switchgear cabinet extends over the outer wall (15) and transitions into the ornamental surface (34).

9. In a profiled frame for a switchgear cabinet having an inner profiled section and an outer profiled section, wherein the inner profiled section is made from a sheet steel blank and has a plurality of fastening receivers on which built-ins can be fixed in place in an interior of the switchgear cabinet, the improvement comprising:

the outer profiled section (30) designed as an extruded profiled section and having at least one ornamental surface (34, 36) oriented toward an exterior of the switchgear cabinet; and the inner profiled section (10) having two profiled sides (11, 13) extending at right angles with respect to each other and which face the interior of the switchgear cabinet and have rows of fastening receivers (12, 14) spaced apart from each other at equal distances, an outer wall (15) facing the exterior of the switchgear cabinet connected with one of the profiled sides (13) on which the outer profiled section (30) is supported, and the detent surface (17) on which a detent face (39) of the outer profiled section (30) is supported arranged at an angle with the outer wall (15).

10. In the profiled frame in accordance with claim 9, wherein the outer profiled section (30) has a screw channel (38) formed and extending in a longitudinal profile direction, which is embodied in a groove shape and has an open side facing the inner profiled section (10), and a plurality of fastening screws (41) are inserted into screw receivers (17.1) of the inner profiled section (10) and are screwed into the screw channel (38) to fix the outer profiled section (30) in place on the inner profiled section (10).

11. In the profiled frame in accordance with claim 9, wherein the inner profiled section (10) has a plug receiver (15.4) into which a plug shoulder (31) of the outer profiled section (30) is inserted, the inner profiled section (10) has a detent surface (17) with which the outer profiled section (30) contacts with a contact surface (39) and limits an insertion movement of the plug shoulder (31), and with the plug shoulder (31) inserted the outer profiled section (30) is screwed together with the inner profiled section (10).

* * * * *